(12) United States Patent
Kim

(10) Patent No.: US 6,661,160 B2
(45) Date of Patent: Dec. 9, 2003

(54) HIGH POWER DENSITY DUAL-ROTOR DEVICE

(75) Inventor: Chulho Kim, Burke, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/153,941

(22) Filed: May 24, 2002

(65) Prior Publication Data

US 2003/0048043 A1 Mar. 13, 2003

Related U.S. Application Data

(63) Continuation-in-part of application No. 09/697,716, filed on Oct. 27, 2000, now Pat. No. 6,417,601.
(60) Provisional application No. 60/162,527, filed on Oct. 29, 1999.

(51) Int. Cl.[7] .............................................. H01L 41/08
(52) U.S. Cl. ......................... 310/333; 310/337; 310/359
(58) Field of Search ................................. 310/333, 337, 310/359, 366

(56) References Cited

U.S. PATENT DOCUMENTS

| | | | | |
|---|---|---|---|---|
| 2,835,696 A | * | 5/1958 | Thurston | 560/91 |
| 2,838,695 A | * | 6/1958 | Mason | 310/361 |
| 4,965,482 A | * | 10/1990 | Ohnishi et al. | 310/323.13 |
| 5,306,979 A | * | 4/1994 | Schwarz, Jr. | 310/328 |
| 5,942,838 A | | 8/1999 | Lee et al. | |
| 6,020,674 A | * | 2/2000 | Zhang et al. | 310/333 |
| 6,417,601 B1 | * | 7/2002 | Kim | 310/333 |

OTHER PUBLICATIONS

Glazounov et al, "A New Torsional Actuator Based On Shear Piezoelectric Response", Applied Physics Letters, vol. 3324, 1998.

Kim et al, "High Authority Piezoelectric Torsional Actuators", IEEE Transactions on Ultrasonics, Ferroelectrics, and Frequency Control, 1998.
A.E. Glazounov et al, "Piezoelectric Actuator Generating Torsional Displacement From Piezoelectric d 15 Response", Applied Physics Letters, vol. 72, No. 20, pp. 2526–2528, May 1998.
Kim et al, "Piezoelectric Ceramic Assembly Tubes for Torsional Actuators", Part of the SPIE Conference on Smart Materials Technologies, vol. 3675, pp. 53–62, Mar. 1999.
Kim et al, "Piezoelectric Torsional Actuators", DARPA Actuator Technology Interchange Meeting #3, Jun. 17–18, 1999.
A.E. Glazounov et al, "High–Efficiency Piezoelectric Motor Combining Continuous Rotation With Precise Control Over Angular Positioning", Applied Physics Letters, vol. 75, No. 6, pp. 862–864, Aug. 1999.
Kim et al, "Development of Piezoelectric Ceramic Torsional Actuators Based on Shear Piezoelectric Response and Their Potential Applications", Proceedings of the 9th US–Japan Seminar on Dielectric & Piezoelectric Ceramincs, Okinawa, Japan, Nov. 3–5, 1999.

(List continued on next page.)

Primary Examiner—Thomas M. Dougherty
Assistant Examiner—Karen Addison
(74) Attorney, Agent, or Firm—Joseph T. Grunkemeyer; John J. Karasek

(57) ABSTRACT

A torsional motor, comprising: a plurality of segments in the shape of a tube comprising an electroactive material with a poling along the length dimension with adjacent segments arranged with their respective polings in opposed directions; a plurality of conductors between the adjacent segments; a first one-way clutch; a second one-way clutch; a first rotor positioned relative to the first one-way clutch such that the angular displacement of the tube in one direction is transmitted by the first one-way clutch to the first rotor; and a second rotor positioned relative to the second one-way clutch such that the angular displacement of the tube in one direction is transmitted by the second one-way clutch to the second rotor.

37 Claims, 7 Drawing Sheets

OTHER PUBLICATIONS

A.E. Glazounov et al, "Torsional Actuator Based On Mechanically Amplified Shear Piezoelectric Response", Sensors and Actuators, vol. 79, pp. 22–30, 2000.

A.E. Glazounov et al, "Piezoelectric Stepper Motor With Direct Coupling Mechanism to Achieve High Efficiency and Precise Control of Motion", IEEE Transactions on Ultrasonics, Ferroelectrics, and *and Frequency Control*, vol. 47, No. 4, pp. 1059–1067, Jul. 2000.

Chulho Kim, "Piezoelectric Torsional Vibration Driven Motor", Provisional Application 60/162,527 Filed Nov. 29, 1999.

Chulho Kim, "Piezoelectric Torsional Vibration Driven Motor", U.S. patent application 09/697,716 filed Nov. 20, 2000.

Kim et al, "Piezoelectric Rotary Pump", U.S. patent application 10/113,640 filed Mar. 29, 2002.

* cited by examiner

HIGH POWER DENSITY DUAL-ROTOR DEVICE

This application is a continuation-in-part of U.S. patent application Ser. No. 09/697,716 filed on Oct. 27, 2000, now U.S. Pat. No. 6,417,601 which claimed priority to U.S. Provisional Application No. 60/162,527 filed on Oct. 29, 1999.

BACKGROUND OF THE INVENTION

1. Field of the Invention

The present invention relates to piezoelectric motors, and more specifically to piezoelectric torsional vibration driven motors.

2. Description of the Prior Art

The use of piezoelectric ceramic materials such as lead zirconate titanate (PZT) is well known for applications for sensors, transducers, actuators, and other electromechanical devices.

Many actuators have been developed using electroactive materials, including the torsional actuator disclosed in U.S. Pat. No. 6,020,674. This torsional actuator uses an even number of alternately poled segments of electroactive material that are arranged side by side. The segments are bound together in an integral structure, with conductors positioned between adjacent segments. Under an applied electric field, the torsional actuator produces large angular displacement and a high torque. Similarly, a torsional piezoelectric actuator is described in Glazounov et al., "Piezoelectric Actuator Generating Torsional Displacement from Piezoelectric $d_{15}$ Shear Response", *Appl. Phys. Lett.* 72, pages 2526–2528, 1998.

For some applications, a large rotational motion with a large torque output is demanded. For example, vibration and noise control systems for helicopter rotor blades require an actuator that can provide large amplitude rotational motion with a high torque.

Piezoelectric ultrasonic motors have been developed using traveling wave and standing wave theories that provide higher torque density than electromagnetic motors. An example of the current art in piezoelectric motor technology is provided in Glenn et al., "Development of a Two-Sided Piezoelectric Rotary Motor for High Torque", SPIE 3041, 1997. These piezoelectric ultrasonic motors are of limited application, however, because they have either lower power density or lower efficiency than conventional electromagnetic motors.

U.S. patent application Ser. No. 09/697,716, incorporated herein by reference, discloses a torsional motor comprising the actuator of U.S. Pat. No. 6,020,674, a rotor, and one or two one-way clutches. The one-way clutches transmit angular displacement of the actuator to the rotor such that the rotor rotates in a single direction. The use of a single one-way clutch produces a half-cycle torsional motor. The use of two one-way clutches produces a full-cycle torsional motor. The half-cycle torsional motor transmits the angular displacement of only one end of the actuator. The full-cycle torsional motor also transmits the angular displacement of the other end of the actuator. Thus, the full-cycle torsional motor produces about double the rotary speed (rpm) as the half-cycle torsional motor at the resonance condition. U.S. patent application Ser. No. 09/697,716 discloses the use of a single rotor.

U.S. patent application Ser. No. 10/113,640, incorporated herein by reference, discloses the use of a second set of one-way clutches for reversing the direction of rotation of the rotor. The rotor is a helical shaft for pumping. The shaft rotates one direction or the other depending on which set of clutches is engaged.

There remains a need for a compact, simple, lightweight dual-rotor motor, which uses a torsional actuator as a stator, providing high torque density, high power density, and high efficiency in response to an alternating electric field.

SUMMARY OF THE INVENTION

It is an object of the invention to provide a piezoelectric dual-rotor motor with high torque density, high power density, and high efficiency.

It is an object of this invention to provide a compact and lightweight piezoelectric motor.

It is an object of this invention to provide a simple piezoelectric motor, which converts an alternating electric field to torsional vibration and directly into rotary motion.

It is an object of this invention to provide a full-cycle piezoelectric torsional vibration motor.

These and other objects are achieved by a torsional motor, comprising a plurality of segments comprising an electroactive material having a poling along the length dimension of each segment arranged in the shape of a tube; a plurality of conductors disposed between adjacent segments; two or more one-way clutches, and two rotors, whereby the angular displacements of the tube are transmitted to the rotors.

LIST OF REFERENCE NUMBERS

| | |
|---|---|
| 10 | segments |
| 30 | conductors |
| 50 | cam |
| 60 | roller |
| 70 | rotor |
| 80 | spring |
| 400, 500, 600, 700, 800 | torsional actuator |
| 501 | end of actuator |
| 402, 502 | nodal point |
| 503 | end of actuator |
| 404 | free end of actuator |
| 705, 805 | actuator roller |
| 406 | support |
| 807 | actuator roller |
| 410, 510, 710, 810 | first clutch of first set |
| 711, 811 | first clutch of second set |
| 420, 520, 720, 820 | second clutch of first set |
| 721, 821 | second clutch of second set |
| 530, 830 | third clutch of first set |
| 831 | third clutch of second set |
| 540, 840 | fourth clutch of first set |
| 841 | fourth clutch of second set |
| 450, 550, 650, 750, 850, 950 | first rotor |
| 951 | first rotor front housing |
| 952 | first rotor rear housing |
| 755, 855 | first rotor roller |
| 956 | first rotor screw-threading |
| 857 | first rotor roller |
| 458, 658 | first rotor propeller |
| 460, 560, 760, 860, 960 | second rotor |
| 961 | second rotor housing |
| 462 | second rotor-narrowing |
| 664 | part of second rotor |
| 665 | part of second rotor |
| 966 | second rotor screw-threading |
| 468, 668 | second rotor propeller |
| 669 | second rotor propeller |

DETAILED DESCRIPTION OF THE PREFERRED EMBODIMENTS

Figure 1A:
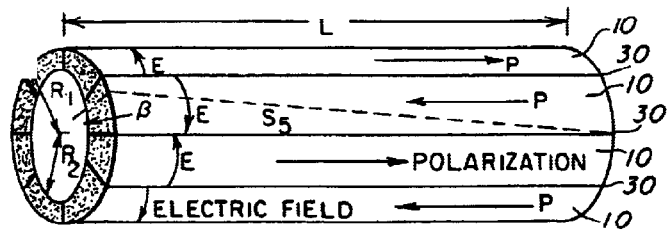
FIG. 1a schematically illustrates a torsional actuator and the relationship between the polarization of electroactive segments and the applied electric field.
Figure 1B:
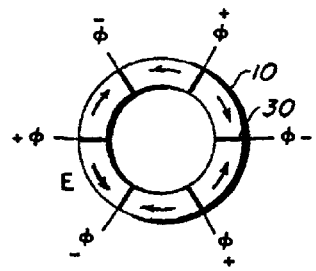
FIG. 1b schematically illustrates the applied electric field for the torsional actuator.

A torsional motor as described herein comprises a torsional actuator, two or more one-way clutches, and two rotors. FIGS. 1a and 1b schematically illustrate the torsional actuator. Several torsional actuators that may be used for this purpose are described in U.S. Pat. No. 6,020,674, incorporated herein in its entirety. The torsional actuator uses a plurality of alternately poled segments 10 of electroactive material, which are arranged side by side. Typically, an even number of segments 10 is used. Typically, the number of segments is from 2 to 100. More typically, the number of segments is from 4 to 32. The segments are bound together in an integral structure, with electrical conductors 30 positioned between adjacent segments. An electrically conductive epoxy or other conductive adhesive may be used to bond the segments together and to act as the conductor. Typically, the ratio of the length of the segments to the radius of the tube is greater than one.

Each electroactive segment has a poling along its length dimension. Typically, the poling is along the entire length dimension of each segment. The segments are arranged in the shape of a tube so that adjacent segments have the poling direction opposite to each other. Typically, the tube is cylindrically shaped. Typically, the cross-section of the tube is circular or polygonal. The tube need not have the same inner and outer diameters at all points. The conductors are connected electrically in parallel, allowing an electric field E to be applied to each segment in a direction perpendicular to the polarization $P_s$ of each segment 10. The applied field has opposite-polarity in adjacent segments. The relationship between the direction of polarization and the applied field for adjacent segments is shown in FIG. 1a. An applied electric field induces a shear deformation in each segment. The shear strain α is proportional to applied electric field E and the shear piezoelectric coefficient d15:

$$\alpha = d_{15} E \qquad \text{Equation (1)}$$

All equations and statements regarding physical quantities herein are illustrative and are not intended to limit the scope of the invention. Due to the cylindrical symmetry of the actuator, the shear strain α is directly transformed into angular displacement of each portion of the tube along the length dimension of the tube. Specifically, there is an angular displacement of one end of the tube with respect to the other end of the tube, β, such that $$\beta = \left(\frac{L}{R}\right)\alpha = \left(\frac{L}{R}\right)d_{15}E \qquad \text{Equation (2)}$$

where L is the length of the actuator and R is the radius of the actuator. By using an actuator with a large value of L/R, a large torsional displacement β can be achieved, even though shear strain α is usually quite small in piezoelectric materials.

If the length of the actuator, L, is greater than the radius of the actuator, R, then the torsional displacement of the end of the actuator β will be larger than the shear strain α induced in each segment of the actuator, and the actuator will be an effective amplifier of angular displacement. The value of L/R is therefore considered the geometric amplification factor.

When a voltage V is applied to the actuator segments, the electric field E in each segment will be:

$$E \approx \frac{nV}{\pi(R_1 + R_2)} = \frac{nV}{2\pi R} \qquad \text{Equation (3)}$$

The torque developed by the actuator, T, will be $$T = \frac{d_{15} nV(R_1 - R_2)}{s^E_{44}} R \qquad \text{Equation (4)}$$

where R is equal to the average of the inner and outer radii of the actuator ($R=(R_1+R_2)/2$), n is the number of segments, and $s^E_{44}$ is the shear elastic compliance at a constant electric field. Hence, although the angular displacement β increases linearly with the length of the actuator L, the torque T is independent of the length of the actuator.

Typically, the electroactive material selected for the actuator segments has a high shear response under the limiting electric fields (the field limit before de-poling occurs) as well as a high shear piezoelectric coefficient $d_{15}$ under operating conditions. Typically, the material also has a low elastic shear compliance and a high de-poling shear stress.

Actuators with a polygonal cross-section may be assembled using long segments having trapezoidal cross-sections. Actuators with a circular cross-section may be assembled using segments having a circular arc cross-section. Other actuator configurations may be built, as will be apparent to those skilled in the art.

EXAMPLE OF A TORSIONAL ACTUATOR

An actuator was manufactured using PZT-5A material obtained from EDO Inc., which has a high maximum shear piezoelectric response (greater than 1,200 micro-strain).

This material demonstrated a significant nonlinear behavior with respect to the field. The PZT-5A has a $d_{15}$ coefficient at high fields (4.8 kV) of 2,500 pC/N, compared to a $d_{15}$ coefficient of 700 pC/N at low fields (less than 200 V). There is, however, no marked response ($d_{15}$ change) to the shear load applied up to stresses of 10 MPa.

A continuous poling fixture was used to apply this polarization in the longitudinal direction. The fixture applies a poling by moving two conductive rubber electrodes along the length of a segment (5 to 15 cm) at a rate of 0.2 to 1.0 cm per minute, while applying a desired electric field to one end. Moving the electrodes allows the segment to be exposed to sufficient electric field strength needed to approach full uniform spontaneous polarization while avoiding material breakdown that would be the result of applying a large voltage across the entire length of the segment.

The segments of PZT-5A were poled with the continuous poling fixture by moving the two electrodes separated by a distance of 1.4 cm along the length dimension of each segment at a rate of 0.2 to 1.0 cm per minute with 20 kV between electrodes while the entire system was immersed in a dielectric oil bath heated to a temperature of 80 to 100° C. These long segments of PZT-5A exhibited a large $d_{33}$ value of greater than 460 pC/N. This is more than 95% of the $d_{33}$ value of shorter PZT-5A samples that were poled fully using a conventional poling method (~480 pC/N). The value of d33 did not significantly vary within the stated ranges of rate and temperature.

The continuously poled segments were assembled into a cylindrical actuator and were joined by a high shear strength conductive epoxy, which serves as an electrical conductor and adheres the adjacent sides of the segments to one another. The epoxy was selected based on its high shear strength and a curing temperature below the Curie temperature of the material being joined. An example of a suitable epoxy is MB-10HT/S, which is then cured using a vacuum bagging process, which typically results in joints which are approximately 25 μm in thickness and very uniform along the length of the joints. This process is described in "Piezoelectric Ceramic Assembly Tubes for Torsional Actuators," C. Kim, A. E. Glazounov, F. D. Flippen, A. Pattnaik, Q. Zhang, D. Lewis, *SPIE Proceedings,* Volume 3675, March 1999, incorporated herein in its entirety. Other methods of joining the segments and conducting an electric field may be used; however, the joining method must have sufficient shear strength to maintain the structural integrity of the actuator.

Other examples of torsional actuators and the continuous poling fixture are described in the report NRL/MR/6380-97-7997, "Composite Piezoelectric Assemblies for Torsional Actuators," C. Kim, T. Jensen, V. DeGiorgi, B. Bender, C. Cm Wu, D. Flippen, D. Lewis, Q. Zhang, V. Mueller, M. Kahn, R. Silberglitt, and L. K. Len, Sep. 30, 1997, incorporated herein in its entirety. Additional examples of torsional actuators are described in "Piezoelectric Ceramic Assembly Tubes for Torsional Actuators," C. Kim, A. E. Glazounov, F. D. Flippen, A. Pattnaik, Q. Zhang, D. Lewis, *SPIE Proceedings,* Volume 3675, March 1999; "Piezoelectric Actuator Generating Torsional Displacement from Piezoelectric $d_{15}$ Shear Response," A. E. Glazounov, Q. Zhang, and C. Kim, *Appl. Phys. Lett.,* Volume 72, Number 20, May 1998, and "High Authority Piezoelectric Torsional Actuators," C. Kim, D. Lewis, C. Cm Wu, A. E. Glazounov, Q. Zhang, *Proceedings of the Eleventh IEEE International Symposium on Applications of Ferroelectrics* (IEEE ISAF), #0-7803-4959-8/98, all incorporated herein in their entirety.

Figure 2:
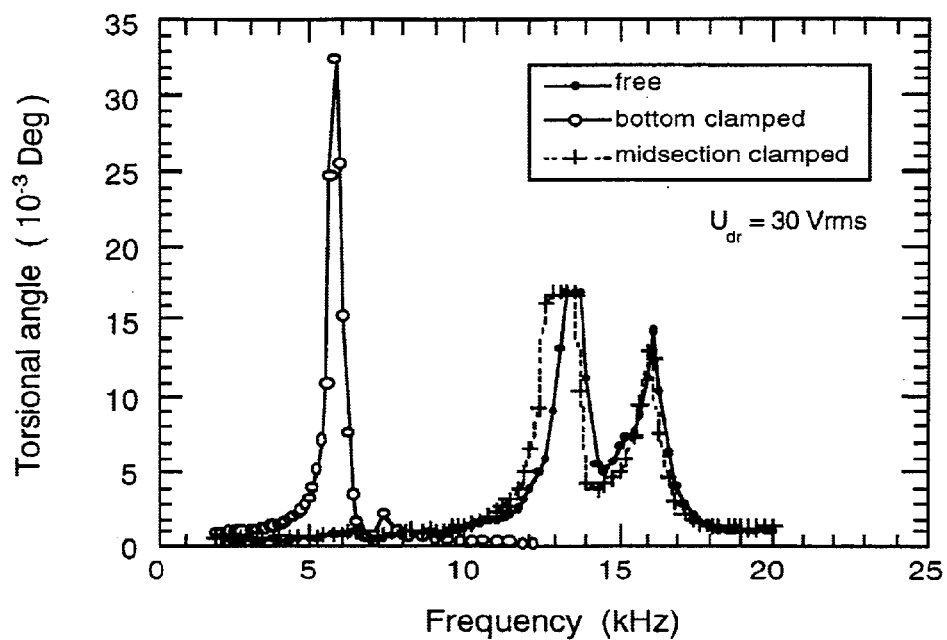
FIG. 2 shows the frequency dependence of a torsional actuator under applied electric fields for different clamping conditions.

Equivalent circuit analogy around the resonant frequency, $f_r$, shows that the resonant frequency dependence of the torsional angle β is given by:

$$\beta(f_r) = d_{15} E (L/R_1) Q_m \qquad \text{Equation (5)}$$

where $d_{15}$ is the piezoelectric shear coefficient and $Q_m$ is the mechanical quality factor of the actuator. The mechanical quality factor $Q_m$ is an additional torsional angle amplification term, which can be utilized in piezoelectric ultrasonic motor development. In order to provide a large angular displacement, β, a material having a high $Q_m$ is chosen for the actuator segments. For example, in one embodiment, a hard piezoelectric ceramic material (APC-841, available from APC International, Ltd.) was selected as an actuator material because of its high $Q_m$ value. FIG. 2 shows the frequency dependence of a torsional actuator under applied electric fields for different clamping conditions. The applied alternating voltage was 30 $V_{rms}$. The peaks represent resonant frequencies.

Torsional Motors

A torsional actuator as described above, with electroactive segments, having a length L and a radius R, can be used as the stator in a dual-rotor torsional motor. Such a torsional motor provides high torque and high efficiency. The torsional motor has several components, including a stator, two or more one-way clutches, and two rotors.

The motor can further comprise means for supplying alternating voltage to the conductors. The means for supplying alternating voltage can be any means known in the art for generating an alternating electric field, such as a voltage source. Suitable alternating electric fields include, but are not limited to square, triangular, and sine waveforms. The motor can also further comprise means for connecting the conductors to the means for supplying alternating voltage. The means for connecting can be any means known in the art for forming an electrical connection between the conductors and the means for supplying alternating voltage. The connection is done such that opposite polarity electric fields are applied across adjacent segments.

When an alternating electric field is applied to a torsional actuator, the tube will twist back and forth in response to the applied electric field. A portion of the tube can be held fixed such that the tube has no angular displacement at that portion. Alternatively, the no portion of the tube may be held fixed. A portion of the tube that shows no angular displacement is a nodal point.

Figure 3:
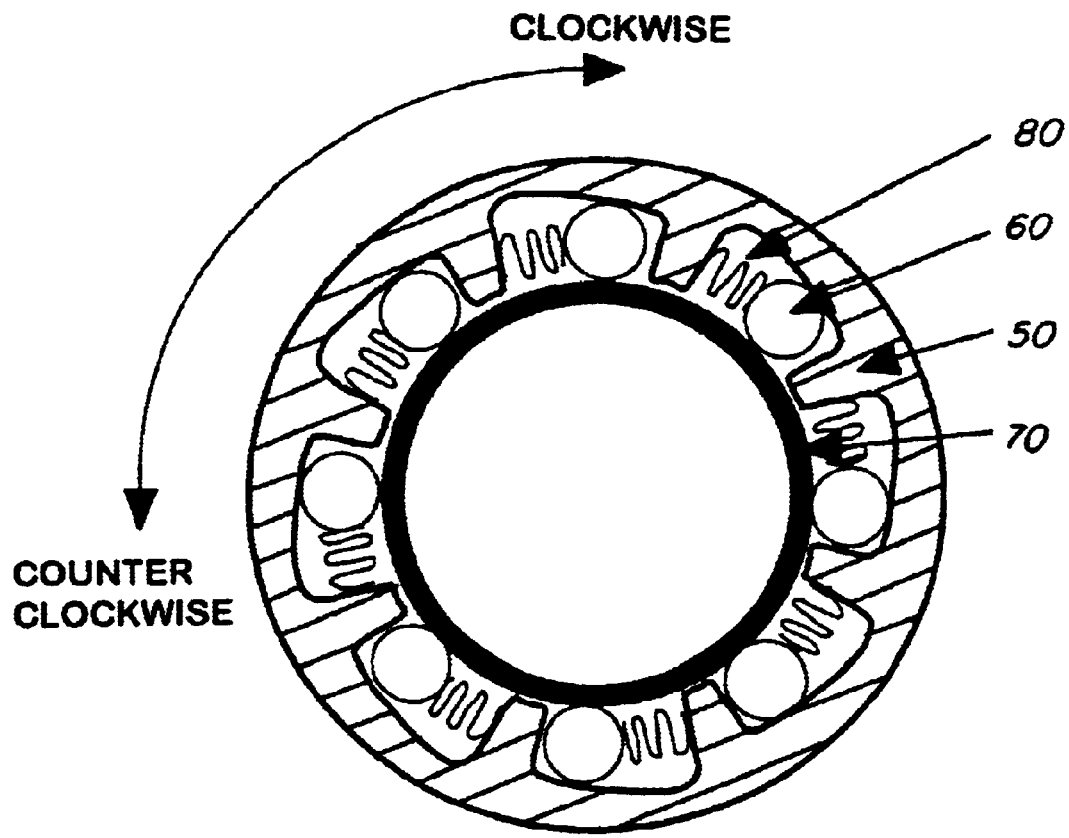
FIG. 3 schematically illustrates a one-way roller clutch for use in a torsional electroactive motor.

A one-way clutch is used to transmit the angular displacement of a portion of the tube in one direction only to a rotor, ensuring the rotor turns in the same direction at all times. As used herein, the term "clutch" is synonymous with "one-way clutch." An example of a one-way roller clutch that may be used is shown in FIG. 3. The torsional actuator (not shown) is fixedly attached to the clutch cam 50, so as the torsional actuator and cam 50 rotate in a counter-clockwise direction, the rollers 60 jam between the rotor 70 and the cam 50, locking them together. This allows the angular displacement of the actuator to be transmitted to the rotor 70. As the actuator and cam 50 rotate in an opposite (clockwise) direction, the springs 80 are compressed by the rollers 60, the rollers 60 slip, and the actuator and cam 50 are allowed to rotate freely, so no clockwise angular displacement of the actuator is transmitted to the rotor 70. Thus, the roller clutch transmits angular displacement of the actuator to the rotor 70 only if the actuator and cam 50 move in the counterclockwise direction when the rollers 60 are wedged between the tilted slope of the cam 50 and the surface of the rotor 70. A one-way roller clutch can also be designed with the cam on the outside of the actuator and the rotor on the outside of the clutch. Other designs for one-way clutches are known in the art and may be suitable in the present invention.

Half-Cycle Motors

A half-cycle dual-rotor motor comprises the torsional actuator, a first one-way clutch, a second one-way clutch, a first rotor, and a second rotor. The two clutches are referred to collectively as the first set of one-way clutches. The first one-way clutch is at a first position on the tube and the second one-way clutch is at a second position on the tube. Typically, both clutches are at one end of the tube, and the other end is a nodal point. Typically, the nodal point is held in a fixed position, and may be affixed to a housing.

The first rotor is positioned relative to the first one-way clutch, such that the angular displacement of the tube in one direction at the first position is transmitted by the first one-way clutch to the first rotor. The second rotor is positioned relative to the second one-way clutch, such that the angular displacement of the tube in one direction at the position is transmitted by the second one-way clutch to the second rotor. As described above, each rotor rotates in the same direction at all times. The first rotor and the second rotor may rotate in the same direction or in opposite directions. The clutches can be positioned facing one direction or the other to rotate the rotors in the desired direction. Typically, the two rotors rotate in opposite directions.

Typically, the rotors are coaxial. This can be achieved, among other ways, by positioning at least a portion of the first rotor inside the tube and at least a portion of the tube inside the second rotor.

Figure 4:
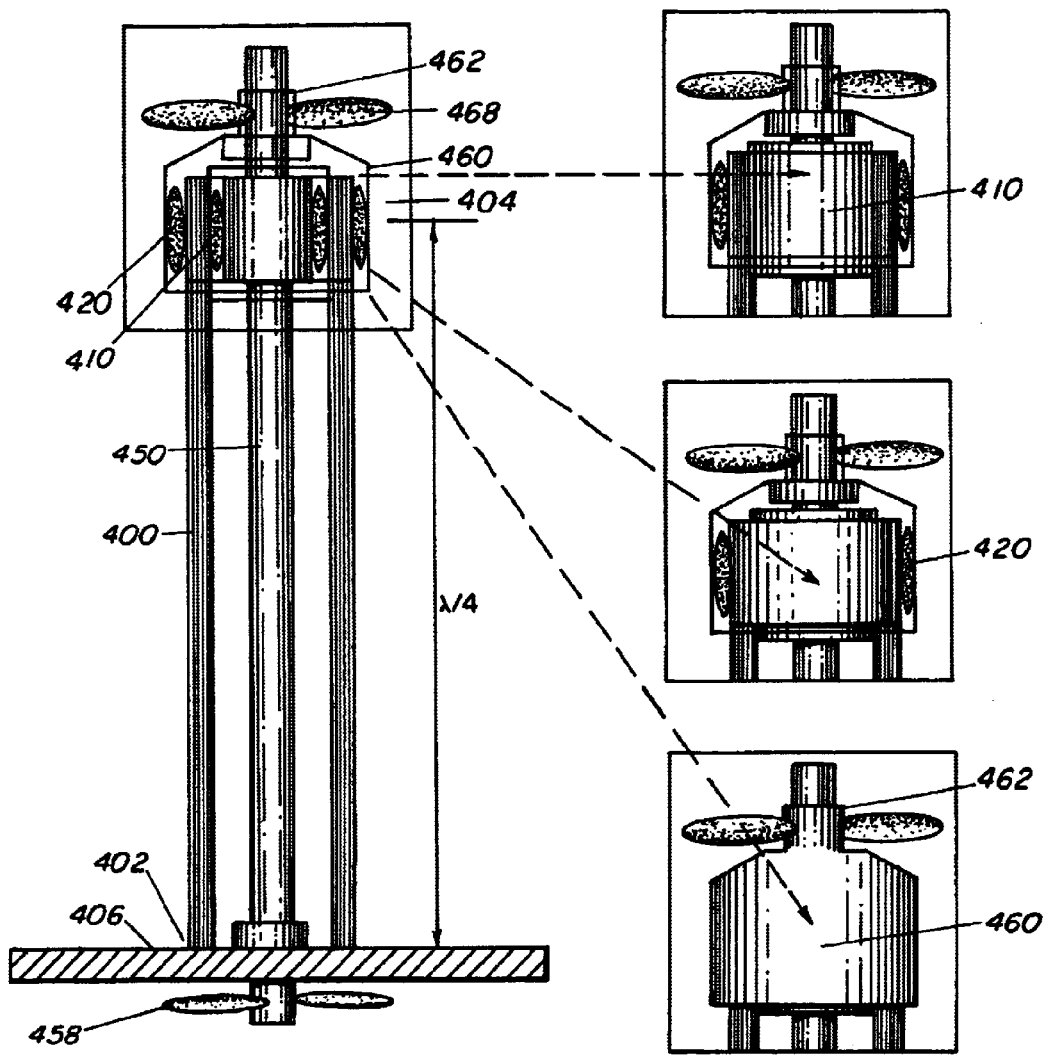
FIG. 4 schematically illustrates an embodiment of a half-cycle torsional electroactive dual-rotor motor using a torsional actuator.

A cross-sectional view of an embodiment of a half cycle torsional electroactive dual-rotor motor is schematically illustrated in FIG. 4. The torsional actuator 400 has a nodal point at one end 402, which is fixed to a support member 406, while the other end 404 of the torsional actuator is allowed to move freely in response to the electric field applied to the conductors across the segments of the torsional actuator 400. The torsional actuator 400 is as described previously and as schematically illustrated in FIGS. 1a and 1b. The first one-way clutch 410 (typically having rollers, a cam, and springs) is affixed to the inside of the torsional actuator 400. The first one-way clutch 410 transmits the angular motion in one direction only of the torsional actuator 400 to the first rotor 450, which is also inside the torsional actuator 400. The first rotor 450 extends beyond the torsional actuator 400 in both directions. When an alternating electric field is applied to the torsional actuator 400, the free end 404 will be angularly displaced relative to the fixed nodal point 402 in an amount β according to Equation (2) above. When the free end 404 is displaced in one angular direction, the first one-way clutch 410 will transfer this motion to the first rotor 450. When the free end 404 is displaced in the other direction, the first one-way clutch 410 is disengaged from the first rotor 450 and will not transmit the angular displacement of the free end 404 to the first rotor 450. The second one-way clutch 420 is affixed to the outside of the torsional actuator 400. The second one-way clutch 420 transmits the angular motion of the free end 404 to the second rotor 460 in the opposite direction from that of the first rotor 450. The second rotor 460 is only at the free end 404 outside the torsional actuator 400 and narrows to a small cylinder 462 that is coaxial with and surrounds the first rotor 450.

As the free end 404 twists in one direction during one half-cycle of the alternating voltage, the first one-way clutch 410 rotates the first rotor 450. As the end of the free end 404 twists in the other direction during the next half-cycle of the alternating voltage, the second one-way clutch 420 rotates the second rotor 460. Thus, each rotor is driven only half of the time.

Other embodiments include, but are not limited to: putting one clutch on each end of the tube, putting both rotors either inside or outside the tube, having both rotors rotate in the same direction, and having a fixed nodal point in the middle of the tube.

The torsional motor may be operated at a resonant frequency $f_r$. If the half cycle motor is operated in a resonance mode, the actuator optimally has a fixed nodal point on one end, has the clutches on the other end, and has a length L equal to ¼λ. The term λ is the shear wave speed divided by the resonant frequency. The fixed end is a nodal point. This allows the maximum angular displacement β to occur at the free end of the actuator, and allows the clutches to transmit maximum angular displacement from the torsional actuator to the rotors. The natural frequency of the actuator, $f_r$, is dependent on the material properties of the electroactive segments which make up the torsional actuator, and the length of the actuator, according to the following equation:

$$f_r = \frac{1}{4L\sqrt{\rho(s_{44}^E)}} \qquad \text{Equation (6)}$$

Referring again to FIG. 4, the optimal length of the torsional actuator (from the fixed end of the actuator to the rotor) is L=¼λ.

Thus, when driving the actuator tube at its resonant frequency, and accumulating the produced angular displacement by using a direct coupling between the actuator (stator) and rotor via the one way clutches, a high efficiency piezoelectric motor generates continuous rotation with precise control over angular positioning.

Full-Cycle Torsional Motors

Power density, torque density, and efficiency can be increased by using additional one-way clutches so that both rotors are driven during the full-cycle of alternating voltage. This full-cycle motor transmits the displacement continuously to the rotors, without any half-cycle dead periods inherent in the half-cycle motors discussed above. A full-cycle torsional motor has the advantage of compact size while providing twice the rotary speed (rpm) of the half-cycle motor at the resonance condition.

The full-cycle dual-rotor motor comprises the same components as the half-cycle motor described above and further comprises a third one-way clutch and a fourth one-way clutch. These clutches are part of the first set of one-way clutches. The third one-way clutch is at a third position on the tube and the fourth one-way clutch is at a fourth position on the tube. Typically, the first and second one-way clutches are at one end of the tube, the third and fourth clutches are at the other end of the tube, and the midpoint of the tube is a nodal point. Typically, a portion of the tube is held fixed, and may be affixed to a housing. The nodal point may be held fixed.

The third one-way clutch is positioned relative to the first rotor, such that the angular displacement of the tube at the third position is transmitted in one direction by the third one-way clutch to the first rotor. The fourth one-way clutch is positioned relative to the second rotor, such that the angular displacement of the tube at the fourth position is transmitted in one direction by the fourth one-way clutch to the second rotor.

The first and third one-way clutches alternate rotating the first rotor in the same direction. One clutch drives the rotor during each half-cycle of the alternating voltage. The same is true for the second and fourth one-way clutches and the second rotor. Typically, the rotors are coaxial as in the half-cycle motor.

Figure 5:
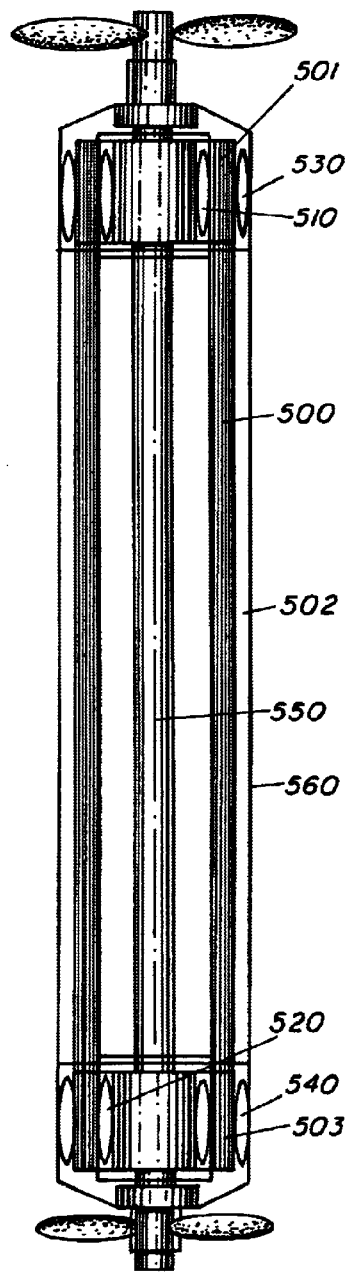
FIG. 5 schematically illustrates an embodiment of a full-cycle torsional electroactive dual-rotor motor using a torsional actuator.

An embodiment of a full-cycle electroactive torsional dual-rotor motor is schematically illustrated in FIG. 5. The torsional actuator 500 has a nodal point at its midpoint 502. The torsional actuator 500 acts as a stator, which generates high frequency torsional oscillations at both ends. The first one-way clutch 510 and the second one-way clutch 520, are positioned at one end 501 of the actuator 500, and the third one-way clutch 530 and the fourth one-way clutch 540 are positioned at the other end 503 of the actuator 500. The first rotor 550 is positioned inside the actuator 500, and the second rotor 560 is positioned outside the actuator 500.

During one half-cycle, the first clutch 510 drives the first rotor 550 in one direction and the fourth clutch 540 drives the second rotor 560 in the opposite direction. During the next half-cycle, the third clutch 530 drives the first rotor 550 in the same direction as the first clutch 510, and the second clutch 520 drives the second rotor 560 in the same direction as the fourth clutch 540. While an alternating voltage is applied, both rotors are continuously driven in opposite directions.

When driving the actuator 500 at a resonant frequency $f_r$, the midpoint of the tube 502 is a nodal point and is stationary and both ends of the actuator 501, 503 oscillate in opposite directions with respect to each other. Optimally, the length L of the actuator for use in a full-cycle piezoelectric motor is equal to $\lambda/2$. This allows the maximum angular displacement $\beta$ to occur at the free ends of the actuator, and allows the motor to transmit maximum angular displacement to the rotor. The natural frequency, $f_r$, of a segment is dependent on the length and material properties of the actuator segments according to Equation (6) above.

Alternatively, a full-cycle motor can be built to operate in a non-resonant mode, in order to transmit higher force at a lower speed. In a non-resonant motor embodiment, the actuator is subjected to a low frequency, high electric field. It is not necessary that the length of the actuator segments be built to correspond to the natural frequency in the non-resonant mode. The twist angle per cycle is proportional to the L/R ratio and the torque is independent of actuator length, so the geometry of the actuator may be varied to achieve the intended result.

Figure 6:
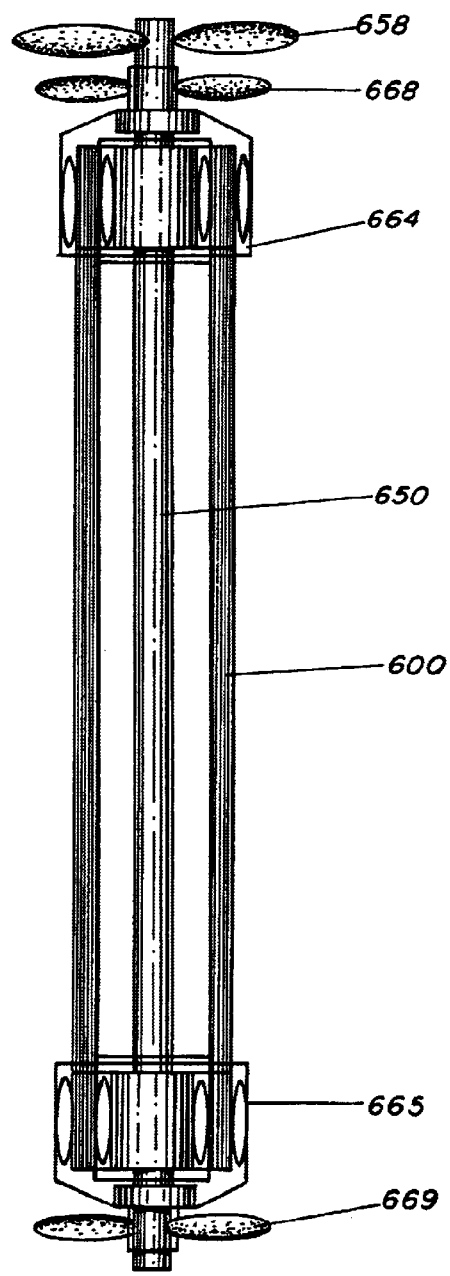
FIG. 6 schematically illustrates an embodiment of a full-cycle torsional electroactive motor having a rotor comprising two separate parts.

Other embodiments are possible in both the half-cycle and full-cycle motors. In some embodiments, either of the rotors can be held in a fixed position while allowing the actuator to freely rotate. This causes the other rotor to rotate twice as fast as when both rotors rotate. In some embodiments, the motor could have three clutches: two of them driving one rotor as a full-cycle motor, and the other clutch driving the other rotor as a half-cycle motor. In some embodiments, two actuators can be used, one to drive each rotor. In some embodiments, any rotor can comprise more than one part. FIG. 6 schematically illustrates an embodiment of a second rotor that comprises two parts. The two parts 664, 665 are each on the ends of the actuator 600. The first rotor 650 is one part extending through the entire actuator 600 although the first rotor 650 can also be in more than one part. The embodiment in FIG. 6 exposes the actuator 600, making it simple to hold the midpoint in a fixed position.

Advantages provided by the full-cycle torsional motor as described herein include an approximately twenty-fold improvement in power density over electromagnetic motors and a thirty-fold increase in power density over current piezoelectric ultrasonic motors. Such a full-cycle torsional motor also provides an approximately forty-fold increase in torque density over current electromagnetic motors and a three-fold increase over current ultrasonic piezoelectric motors, as illustrated in Table 1 below.

TABLE 1

Comparison of electromagnetic (EM) and PZT ultrasonic (US) motors

| Row | Type | Model/Description | Maker | Stall Torque (Ncm) | Max. Speed (rpm) | Peak Eff. (%) | Mass (g) | Torque Density (Ncm/kg) | Power Density (W/kg) |
|---|---|---|---|---|---|---|---|---|---|
| 1 | EM | 1319E003S/Brush DC | Micro Mo | 0.33 | 13,500 | 71 | 11.2 | 29 | 104 |
| 2 | EM | FK-280-2865/Brush DC | Mabuchi | 1.52 | 14,500 | 53 | 36 | 42 | 160 |
| 3 | EM | Brush DC | Maxon | 1.27 | 5,200 | 70 | 38 | 33 | 45 |
| 4 | EM | Brushless DC | Aeroflex | 0.98 | 4,000 | 20 | 256 | 3.8 | 4.0 |
| 5 | EM | Brushless DC | Kannan | 8 | 5,000 | 80 | 600 | 13 | 17 |
| 6 | US | Standing wave, twist coupler | Kumada | 133 | 120 | 80 | 150 | 887 | ~50 |
| 7 | US | USR60, disk-type | Shinsei | 62 | 105 | 23 | 230 | 270 | 16 |
| 8 | US | EF 300/2.8 L, ring-type | Canon | 16 | 40 | 35 | 45 | 356 | ~5 |
| 9 | US | Two-sided prototype | MIT | 170 | 40 | 13 | 330 | 520 | 7.3 |
| 10 | US | 8-mm ring prototype | MIT | 0.054 | 1,750 | n/a | 0.26 | 210 | 108 |

T. S. Glenn and N. W. Hagood, "Development of a two-sided piezoelectric rotary ultrasonic motor for high torque", SPIE vol. 3041, pp. 326–338, 1997

| | | | | | | | | | |
|---|---|---|---|---|---|---|---|---|---|
| 11 | US | 26 mm actuator at E = 0.3 kV/cm | NRL | 111 | 1800 | 80 | 350 | 317 | 148 |
| 12 | US | 26 mm actuator at E = 1.0 kV/cm* | NRL | 430 | 7000 | 80 | 350 | 1230 | 2250 |

*Projected results from a full-cycle piezoelectric torsional vibration driven motor (U.S. patent application No. 60/162,527) using extrapolated revolution speed at E = 1 kV/cm of the measured full-cycle motor data.

The 26 mm torsional actuator (row 11–12 of Table 1) will have superior power density and torque density compared to currently available electromagnetic motors (rows 1–5 of Table 1) and to currently available piezoelectric motors which rely on standing wave and traveling wave theories (rows 6–10 of Table 1). The data in rows 11–12 is for a single-rotor motor using the same kind of actuator and analogous construction as in the present invention.

Reversible Motors

Both the half-cycle and full-cycle motors can be constructed so that the rotation of the rotors is reversible. This is achieved by adding a second set of one-way clutches. The second set comprises a one-way clutch corresponding to each one-way clutch of the first set. Each clutch of the second set transmits angular displacement in the opposite angular direction from the corresponding clutch of the first set. If one set of clutches is engaged to a rotor, the rotation is in one direction, while if the other set is engaged, the rotation is in the opposite direction. Any or all of the components including the tube, the first rotor, the second rotor, the first set, and the second set can be made moveable with respect to each other such that the tube and rotors engage either the first set or the second set. In some embodiments the rotation of each rotor can be selected independently. Typically, the rotation of both rotors is reversed simultaneously.

Figure 7A:
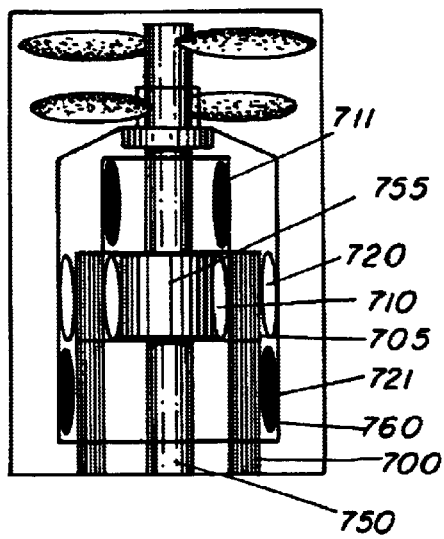
FIGS. 7a and 7b schematically illustrate one end of an embodiment of a reversible half-cycle torsional electroactive dual-rotor motor.
Figure 7B:
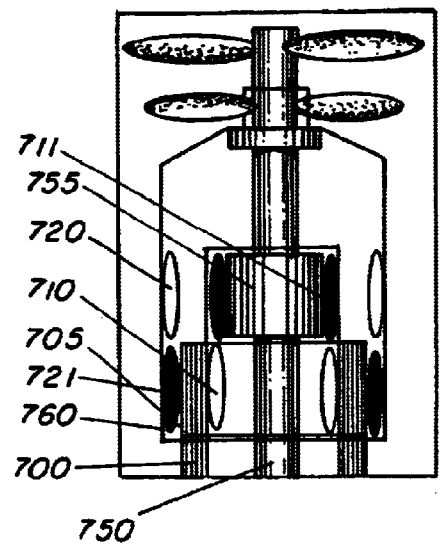

FIGS. 7a and 7b schematically illustrate one end of an embodiment of a reversible half-cycle motor. The first rotor 750 has an integral roller 755 that has a larger radius than the rest of the first rotor. This roller 755 engages either the first clutch of the first set 710 or the first clutch of the second set 711. The actuator 700 also has an integral roller 705 that is wider than the rest of the tube. This roller 705 engages either the second clutch of the first set 720 or the second clutch of the second set 721, which in turn rotates the second set 760. FIG. 7a shows the rollers 705, 755 engaged with the first set of clutches 710, 720. The actuator 700 with roller 705, the first clutch of the first set 710, and the first clutch of the second set 711 are moveable as a unit. FIG. 7b shows this unit moved down relative to in FIG. 7a. This shows the rollers 705, 755 engaged with the second set of clutches 711, 721, reversing the rotation of the rotors.

Figure 8A:
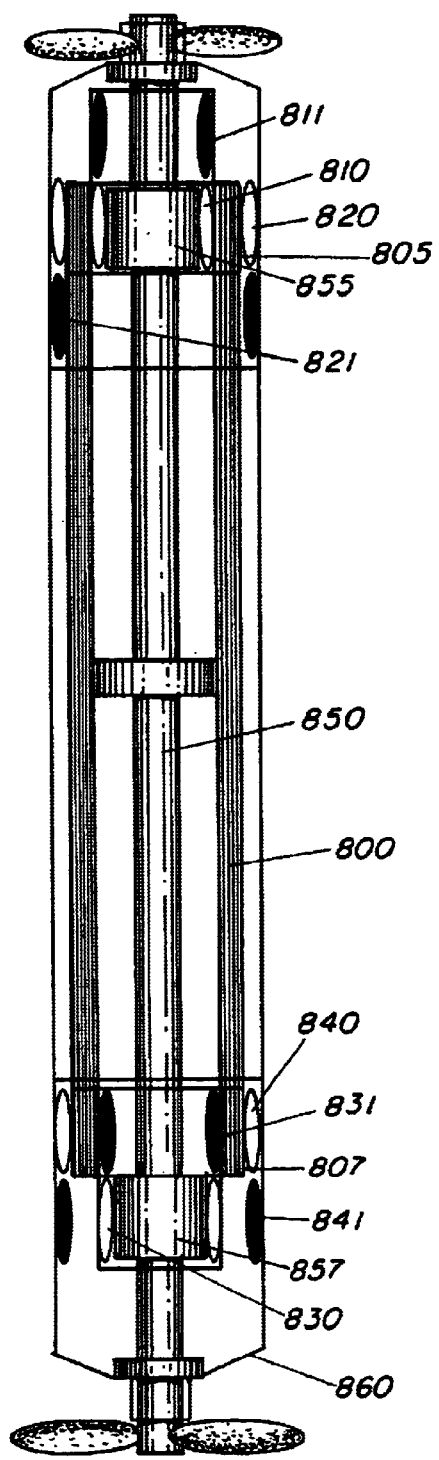
FIGS. 8a and 8b schematically illustrate an embodiment of a reversible full-cycle torsional electroactive dual-rotor motor.
Figure 8B:
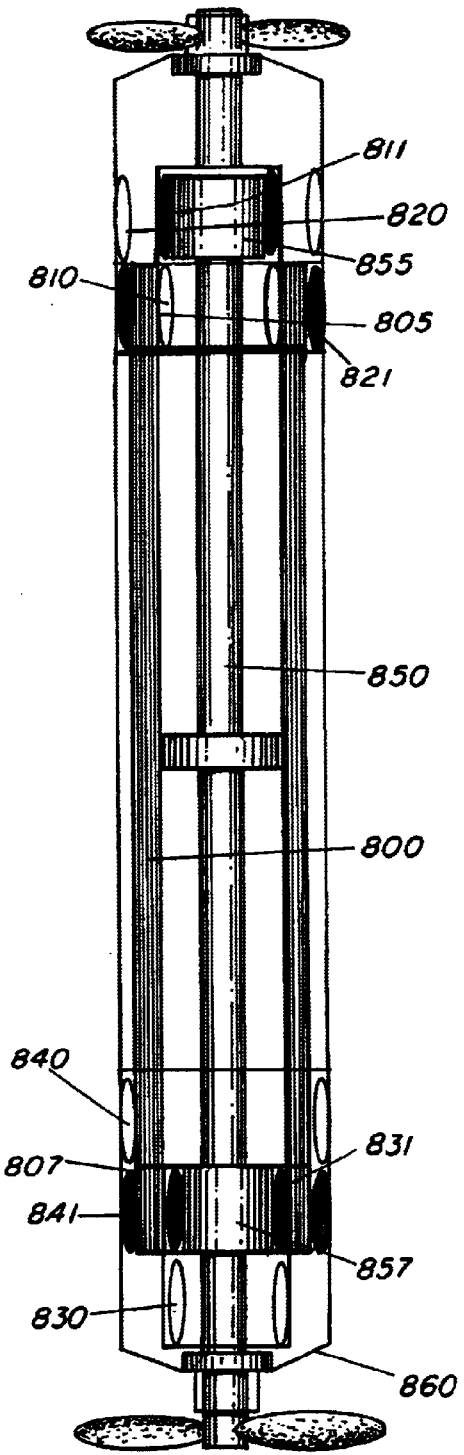

FIGS. 8a and 8b schematically illustrate an embodiment of a reversible full-cycle motor. The first rotor 850 has two rollers 855, 857. One roller 855 engages either the first clutch of the first set 810 or the first clutch of the second set 811. The other roller 857 engages either the third clutch of the first set 830 or the third clutch of the second set 831. The actuator 800 also has two rollers 805, 807. One roller 805 engages either the second clutch of the first set 820 or the second clutch of the second set 821, which in turn rotates the second rotor 860. The other roller 807 engages either the fourth clutch of the first set 840 or the fourth clutch of the second set 841, which in turn rotates the second rotor 860. FIG. 8a shows the rollers 805, 807, 855, 857 engaged with the first set of clutches 810, 820, 830, 840. The actuator 800 with rollers 805, 807, the first clutch of the first set 810, the first clutch of the second set 811, the third clutch of the first set 830, and third clutch of the second set 831 are moveable as a unit. FIG. 8b shows this unit moved down relative to in FIG. 8a. This shows the rollers 805, 807, 855, 857 engaged with the second set of clutches 811, 821, 831, 841, reversing the rotation of the rotors.

Functional Components of Rotors

The rotors can comprise components that allow the motor to perform a function. FIG. 4 through FIG. 8 show rotors with propellers. In FIG. 4 the first rotor 450 has a propeller 458 at the bottom and the second rotor 460 has a propeller 468 at the top. In FIG. 6, the second rotor has two propellers 668, 669, one on each of the two parts 664, 665 of the rotor. This is done because the two parts 664, 666 of the rotor rotate independently. The first rotor 650 also has a propeller 658. The rotors can also comprise an impeller.

The rotors can also comprise a screw-threaded body. This can be useful when the motor is used in a vehicle. The threads can enable the vehicle to propel itself through a medium such as water, air, or the ground. If the motor is reversible as described above, the vehicle can move forwards or backwards. The threads can also comprise selectively-extendable teeth. The teeth can enable the vehicle to change its direction or to move on the surface of the ground.

Figure 9:
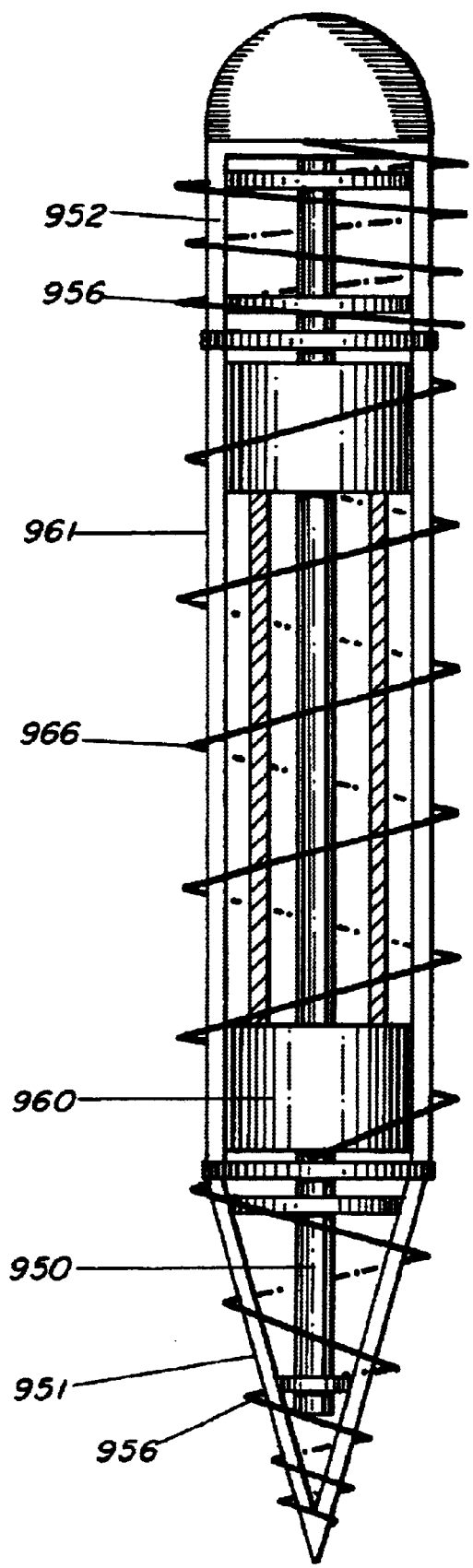
FIG. 9 schematically illustrates an embodiment of a vehicle comprising a torsional electroactive dual-rotor motor comprising screw-threaded bodies.

FIG. 9 schematically illustrates an embodiment of a vehicle comprising a dual-rotor motor where each rotor comprises a screw-threaded body. The second rotor 960 comprises a housing 961 in the middle of the vehicle having a screw-threading 966. The first rotor 950 comprises a housing 951 at the front of the vehicle and a housing 952 at the back of the vehicle, each comprising a screw-threading 956. Since the rotors rotate in opposite directions, the first rotor screw-threads 956 have opposite handedness from the second rotor screw-threads 966.

The above description of several embodiments of the invention is intended for illustrative purposes only. Numerous modifications can be made to the disclosed embodiments, while still remaining within the scope of the invention. To determine the scope of the invention, refer to the following claims.

What is claimed is:

1. A torsional motor, comprising:
    a plurality of segments;
        wherein each segment comprises an electroactive material having a poling along the length dimension of the segment;
        wherein the segments are arranged in the shape of a tube, the length dimensions of the segments are aligned with the length dimension of the tube, and adjacent segments are arranged such that their respective polings are in opposed directions;
    a plurality of conductors;
        wherein the conductors are disposed between the adjacent segments;
    a first set of one-way clutches comprising a first one-way clutch and a second one-way clutch;
        wherein the first one-way clutch is at a first position on the tube;
        wherein the second one-way clutch is at a second position on the tube;
    a first rotor;
        wherein the first one-way clutch transmits angular displacement at the first position of the tube in one direction to the first rotor; and
    a second rotor;
        wherein the second one-way clutch transmits angular displacement at the second position of the tube in one direction to the second rotor;
    whereby rotation of the first rotor and the second rotor occurs during application of opposite-polarity alternating electric fields across adjacent segments.

2. The torsional motor of claim 1,
    wherein the ratio of the length of the segments to the radius of the tube is greater than one.

3. The torsional motor of claim 1,
    wherein the number of segments is from 2 to 100.

4. The torsional motor of claim 1,
    wherein the number of segments is from 4 to 34.

5. The torsional motor of claim 1,
    wherein the electroactive material is a ceramic material having a high shear piezoelectric response.

6. The torsional motor of claim 1,
wherein the segments comprise PZT-5A.
7. The torsional motor of claim 1,
wherein the segments comprise APC-841.
8. The torsional motor of claim 1,
wherein the conductors comprise a conductive adhesive.
9. The torsional motor of claim 1,
further comprising means for supplying alternating voltage to the conductors.
10. The torsional motor of claim 9,
wherein the means for supplying alternating voltage is a voltage source.
11. The torsional motor of claim 9,
further comprising means for connecting the conductors to the means for supplying alternating voltage such that opposite polarity electric fields are applied across adjacent segments.
12. The torsional motor of claim 1,
wherein a portion of the tube is held in a fixed position.
13. The torsional motor of claim 12,
wherein the fixed portion of the tube is affixed to a housing.
14. The torsional motor of claim 12,
wherein the first one-way clutch and the second one-way clutch are at a first end of the tube; and
wherein a second end of the tube at the opposite end from the first end is a nodal point.
15. The torsional motor of claim 13,
wherein the torsional motor has a resonant frequency;
wherein shear waves travel through the torsional motor at a shear wave speed;
wherein the length of the tube is about one-quarter the shear wave speed divided by the resonant frequency.
16. The torsional motor of claim 1,
wherein the first one-way clutch and the second one-way clutch rotate the first rotor and the second rotor in opposite directions.
17. The torsional motor of claim 1,
wherein at least a portion of the first rotor is positioned inside the tube, and at least a portion of the tube is positioned inside the second rotor.
18. The torsional motor of claim 1,
wherein the first rotor, the second rotor, or both comprise more than one independently moveable part.
19. The torsional motor of claim 1,
wherein the first one-way clutch and the second one-way clutch rotate the first rotor and the second rotor in opposite directions;
wherein the first set of one-way clutches further comprises a third one-way clutch and a fourth one-way clutch;
wherein the third one-way clutch is at a third position on the tube;
wherein the third one-way clutch transmits angular displacement at the third position of the tube in one direction to the first rotor;
wherein the first one-way clutch and the third one-way clutch rotate the first rotor in the same direction;
wherein the fourth one-way clutch is at a fourth position on the tube;
wherein the fourth one-way clutch transmits angular displacement at the fourth position of the tube in one direction to the second rotor; and
wherein the second one-way clutch and the fourth one-way clutch rotate the second rotor in the same direction.

20. The torsional motor of claim 19,
wherein the midpoint of the tube is a nodal point.
21. The torsional motor of claim 20,
wherein the torsional motor has a resonant frequency;
wherein shear waves travel through the torsional motor at a shear wave speed;
wherein the length of the tube is about one-half the shear wave speed divided by the resonant frequency.
22. The torsional motor of claim 20,
wherein the first one-way clutch and the second one-way clutch are at a first end of the tube; and
wherein the third one-way clutch and the fourth one-way clutch are at a second end of the tube opposite from the first end.
23. The torsional motor of claim 19,
wherein a portion of the tube is held in a fixed position.
24. The torsional motor of claim 23,
wherein the fixed portion of the tube is affixed to a housing.
25. The torsional motor of claim 19,
wherein either the first rotor or the second rotor is held in a fixed position.
26. The torsional motor of claim 25,
wherein either the first rotor or the second rotor is affixed to a housing.
27. The torsional motor of claim 1, further comprising a second set of one-way clutches;
wherein the second set comprises a one-way clutch corresponding to each one-way clutch of the first set;
wherein any of the tube, the first rotor, the second rotor, the one-way clutches of the first set, and the one-way clutches of the second set are movable with respect each other such that the tube and the first rotor, the second rotor or both engage either the first set or the second set; and
wherein each one-way clutch of the second set rotates the first rotor or the second rotor in the opposite direction as the corresponding one-way clutch of the first set.
28. The torsional motor of claim 27,
wherein both the first rotor and the second rotor together engage either the first set or the second set.
29. The torsional motor of claim 1,
wherein any rotor comprises a propeller.
30. The torsional motor of claim 1,
wherein any rotor comprises an impeller.
31. The torsional motor of claim 1,
wherein any rotor comprises a screw-threaded body.
32. The torsional motor of claim 1,
wherein the first rotor comprises a screw-threaded body; and
wherein the second rotor comprises a screw-threaded body with opposite-handed threads from that of the first rotor.
33. The torsional motor of claim 32,
wherein the screw-threaded bodies comprise selectively extendable teeth.
34. The torsional motor of claim 1,
wherein the torsional motor is capable of propelling the torsional motor through a medium when alternating voltage is applied.
35. The torsional motor of claim 34,
wherein the medium is water.
36. The torsional motor of claim 34,
wherein the medium is air.
37. The torsional motor of claim 34,
wherein the medium is the ground.

\* \* \* \* \*